(12) United States Patent
Aronovich et al.

(10) Patent No.: US 12,386,677 B2
(45) Date of Patent: Aug. 12, 2025

(54) REGULATING CLOUD BUDGET CONSUMPTION

(71) Applicant: International Business Machines Corporation, Armonk, NY (US)

(72) Inventors: Lior Aronovich, Thornhill (CA); Priya Unnikrishnan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 17/500,031

(22) Filed: Oct. 13, 2021

(65) Prior Publication Data
US 2023/0110786 A1    Apr. 13, 2023

(51) Int. Cl.
G06F 9/50 (2006.01)
(52) U.S. Cl.
CPC .......... G06F 9/5083 (2013.01); G06F 9/5022 (2013.01); G06F 9/5044 (2013.01); G06F 2209/504 (2013.01); G06F 2209/508 (2013.01)
(58) Field of Classification Search
None
See application file for complete search history.

(56) References Cited

U.S. PATENT DOCUMENTS

| | | | |
|---|---|---|---|
| 9,690,627 B2 | 6/2017 | Goyal | |
| 10,142,260 B2 | 11/2018 | Buehrer | |
| 11,063,745 B1 * | 7/2021 | Du | H04L 9/0825 |
| 11,134,013 B1 * | 9/2021 | Allen | G06F 9/5072 |
| 2016/0034835 A1 | 2/2016 | Levi | |
| 2020/0167195 A1 | 5/2020 | Aronovich | |

OTHER PUBLICATIONS

"AWS Budgets", Amazon Web Services, downloaded from the Internet Nov. 4, 2020, 6 pages, <https://aws.amazon.com/aws-cost-management/aws-budgets/>.
"Azure—Cost Prediction and Optimizing Spending", Microsoft Azure Fundamentals, downloaded from the Internet on Nov. 4, 2020, 25 pages, <https://www.testpreptraining.com/tutorial/microsoft-azure-fundamentals-az-900/azure-cost-prediction-and-optimizing-spending/>.

(Continued)

*Primary Examiner* — Eric C Wai
(74) *Attorney, Agent, or Firm* — Monchai Chuaychoo (57) ABSTRACT

An approach for optimizing storage on a local storage device. The approach receives a cloud resource budget limit and a cloud budget time interval. The approach estimates future cloud resource requests expected to arrive before the end of the cloud budget time interval. The approach calculates definitive and estimated costs of cloud resource usage types. The approach calculates a total estimated resource budget consumption. The approach determines if the total estimated resource budget consumption exceeds the cloud resource budget limit. If the approach determines the cloud resource budget limit is not exceeded, then the approach outputs a set of existing unfulfilled cloud resource requests for fulfillment. If the approach determines the cloud resource budget limit is exceeded, then the approach outputs a subset of set of existing unfulfilled cloud resource requests that do not exceed the cloud resource budget limit for fulfillment.

20 Claims, 6 Drawing Sheets

(56) References Cited

OTHER PUBLICATIONS

"Method and Apparatus for cognitive detection of Cloud Service forecast and improve it while minimizing the error over time", An IP.com Prior Art Database Technical Disclosure, Authors et al.: Disclosed Anonymously, IP.com No. IPCOM000256425D, IP.com Electronic Publication Date: Nov. 29, 2018, 4 pages.
Bouk, Josh, "How Do You Budget and Forecast for Future Cloud Needs?", Cass Information Systems, Inc., May 7, 2019, 8 pages.
Mell et al., "The NIST Definition of Cloud Computing", Recommendations of the National Institute of Standards and Technology, Special Publication 800-145, Sep. 2011, 7 pages.
Thanasias et al., "VM Capacity-Aware Scheduling within Budget Constraints in IaaS Clouds", PLOS ONE, Research Article, Aug. 8, 2016, DOI:10.1371/journal.pone.0160456, 21 pages.
Aronovich et al., "Estimating Future Cloud Resource Requests", U.S. Appl. No. 17/500,055, filed Oct. 13, 2021.
List of IBM Patents or Patent Applications Treated as Related, Filed Oct. 13, 2021, 2 pages.

\* cited by examiner

REGULATING CLOUD BUDGET CONSUMPTION

TECHNICAL FIELD

The present invention relates generally to cloud computing, and specifically, to regulating cloud resource consumption in view of a cloud resource budget.

BACKGROUND

Cloud bursting is the operation of offloading workloads from local hosts to cloud hosts. Essentially, when workload resource demand exceeds the capacity of resources in a local cluster, additional cloud hosts are provisioned and added to the cluster to meet the resource demand. When there is excess capacity in allocated cloud hosts, this excess capacity is released to the cloud providers.

The cloud bursting capability provides several benefits with cost savings being one of the prominent benefits. Rather than spend the money to build and maintain infrastructure to accommodate spikes in resource usage that occur only occasionally, the cloud bursting mechanism enables offloading workload from the local infrastructure to cloud hosts. Accordingly, added costs for the additional infrastructure are incurred only when additional resources are needed, thereby reducing the total cost of ownership.

Another benefit of cloud bursting is the flexibility to use multiple cloud providers and different types of infrastructures and resources, based on factors such as workload requirements, cost, etc.

Further, improved security is an additional benefit. Cloud providers can offer increased security, isolation of servers, and communication over a private network. Combining local and cloud resources can address security and compliance aspects.

The cloud bursting mechanism provides scalability based on extending the cluster dynamically to cloud providers. Accordingly, by leveraging resources of cloud providers using the cloud bursting mechanism, exposure to outages and downtime can be minimized.

In a cloud bursting mechanism, organizational units may set budget limits for cloud spending for a budget time interval, where a budget time interval is a defined duration of time such as week, month, year, etc. The overall budget of an organizational unit can be divided and shared among sub-units within the organizational unit. The budget limits may be hard limits that cannot be exceeded, or soft limits that can be exceeded at some cases and/or to some extent, and the overspending possibly carried over to a next budget interval. Efficiently utilizing the allocated cloud budget is a challenging problem for organizations.

A major problem in this context is regulating the cloud budget utilization over the budget time interval to prevent over consumption of the budget resources by greedy resource allocations at specific times in the budget time interval. The concern is that greedy resource allocations may exhaust the remaining budget for the remaining time in the budget time interval, preventing further resource requests during the remaining budget time interval from being fulfilled. The challenge is how to regulate the budget utilization over the budget time interval, to prevent such over consumption of budget resources.

BRIEF SUMMARY

According to an embodiment of the present invention, a computer-implemented method for regulating cloud resource budget consumption, the computer-implemented method comprising: receiving, by one or more processors, a cloud resource budget limit and a cloud budget time interval; estimating, by the one or more processors, future cloud resource requests expected to arrive before an end of the cloud budget time interval; calculating, by the one or more processors, definitive costs and estimated costs of cloud resource usage types associated with cloud resource requests; calculating, by the one or more processors, a total estimated resource budget consumption based on summing the definitive costs and the estimated costs; determining, by the one or more processors, if the total estimated resource budget consumption exceeds the cloud resource budget limit; responsive to the total estimated resource budget consumption not exceeding the cloud resource budget limit, outputting, by the one or more processors, a set of existing unfulfilled cloud resource requests that can be fulfilled; and responsive to the total estimated resource budget consumption exceeding the cloud resource budget limit, outputting, by the one or more processors, a subset of the set of existing unfulfilled cloud resource requests that can be fulfilled and do not exceed the cloud resource budget limit.

According to an embodiment of the present invention, a computer program product for regulating cloud resource budget consumption, the computer program product comprising: one or more non-transitory computer readable storage media and program instructions stored on the one or more non-transitory computer readable storage media, the program instructions comprising: program instructions to receive a cloud resource budget limit and a cloud budget time interval; program instructions to estimate future cloud resource requests expected to arrive before an end of the cloud budget time interval; program instructions to calculate definitive costs and estimated costs of cloud resource usage types associated with cloud resource requests; program instructions to calculate a total estimated resource budget consumption based on summing the definitive costs and the estimated costs; program instructions to determine if the total estimated resource budget consumption exceeds the cloud resource budget limit; responsive to the total estimated resource budget consumption not exceeding the cloud resource budget limit, program instructions to output a set of existing unfulfilled cloud resource requests that can be fulfilled; and responsive to the total estimated resource budget consumption exceeding the cloud resource budget limit, program instructions to output a subset of the set of existing unfulfilled cloud resource requests that can be fulfilled and do not exceed the cloud resource budget limit.

According to an embodiment of the present invention, a computer system for regulating cloud resource budget consumption, the computer system comprising: one or more computer processors; one or more non-transitory computer readable storage media; and program instructions stored on the one or more non-transitory computer readable storage media, the program instructions comprising: program instructions to receive a cloud resource budget limit and a cloud budget time interval; program instructions to estimate future cloud resource requests expected to arrive before an end of the cloud budget time interval; program instructions to calculate definitive costs and estimated costs of cloud resource usage types associated with cloud resource requests; program instructions to calculate a total estimated resource budget consumption based on summing the definitive costs and the estimated costs; program instructions to determine if the total estimated resource budget consumption exceeds the cloud resource budget limit; responsive to the total estimated resource budget consumption not exceeding the cloud resource budget limit, program instructions to output a set of existing unfulfilled cloud resource requests that can be fulfilled; and responsive to the total estimated resource budget consumption exceeding the cloud resource budget limit, program instructions to output a subset of the set of existing unfulfilled cloud resource requests that can be fulfilled and do not exceed the cloud resource budget limit.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of regulating cloud resource budget consumption. It should be noted that the techniques employed in these embodiments can also provide for optimizing estimates for future cloud resource requirements, e.g., based, at least in part, on a cloud services analysis over time.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 1:
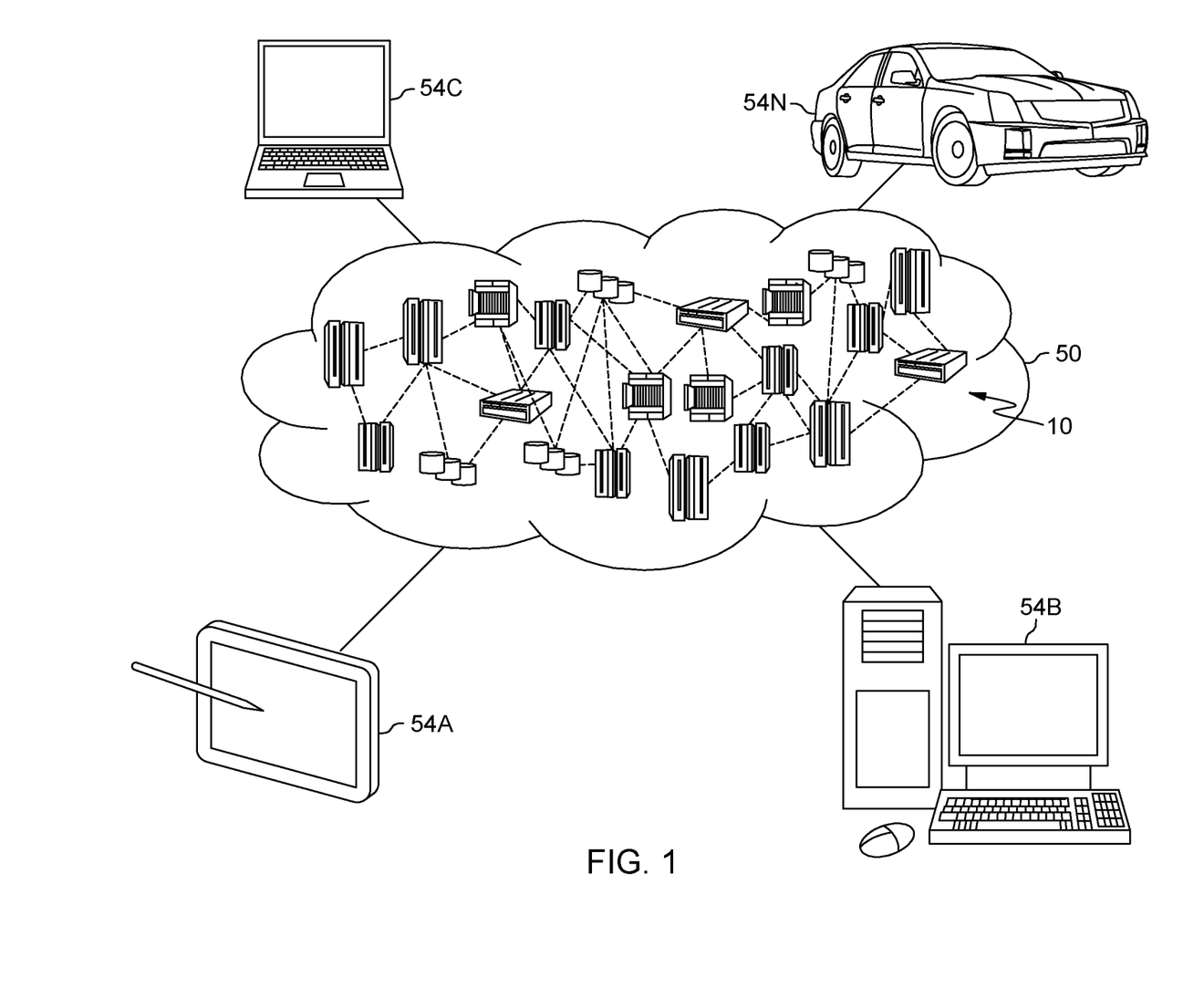
FIG. 1 depicts a cloud computing environment, according to embodiments of the present invention.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
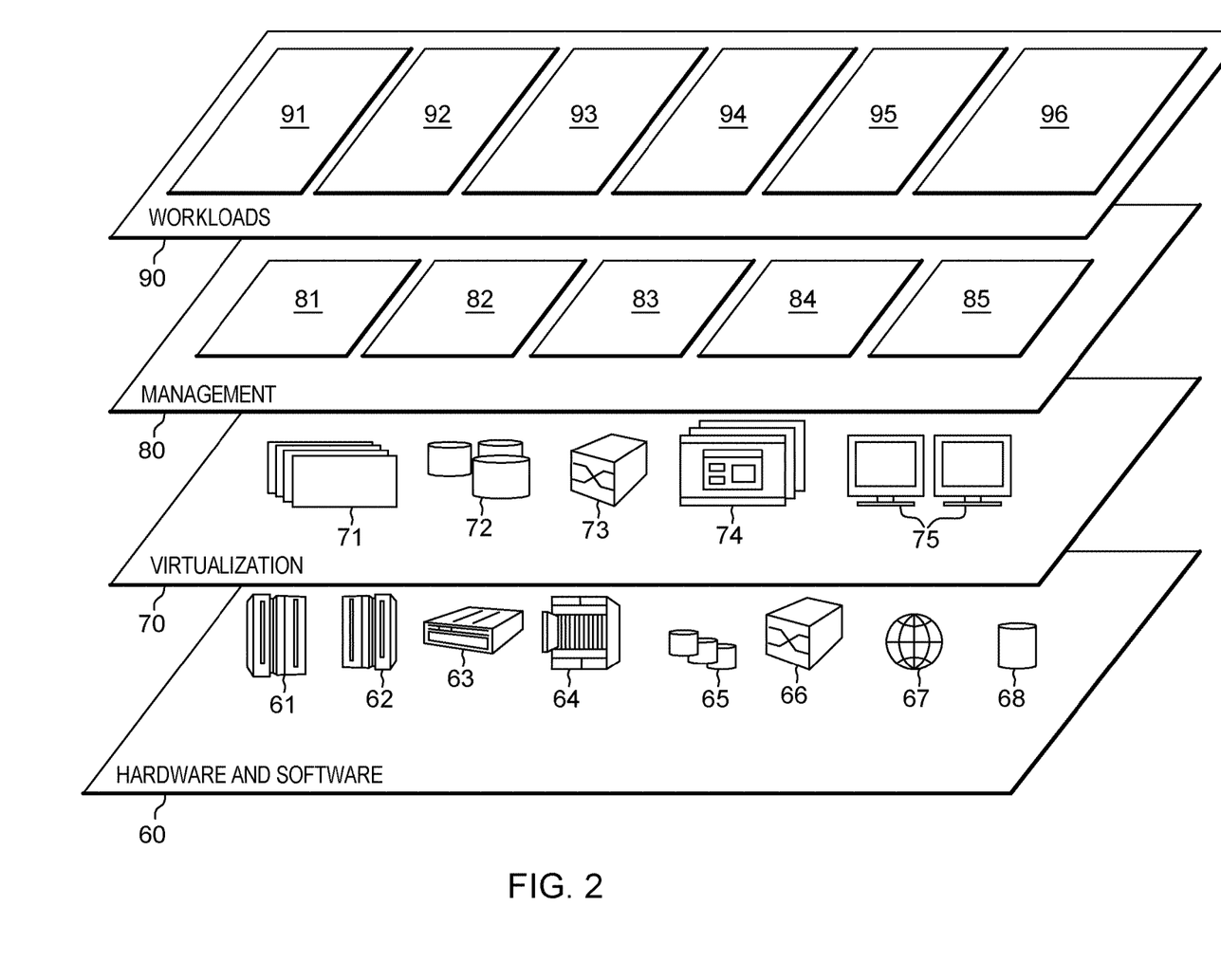
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and cloud resource regulation management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
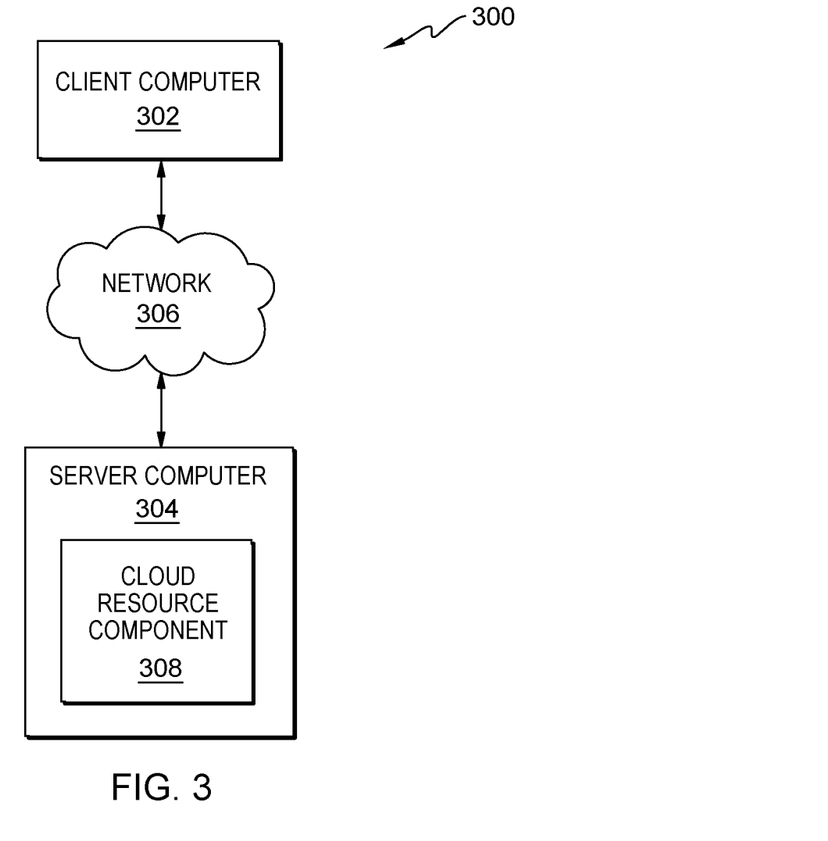
FIG. 3 is a high-level architecture, according to embodiments of the present invention.
Figure 4:
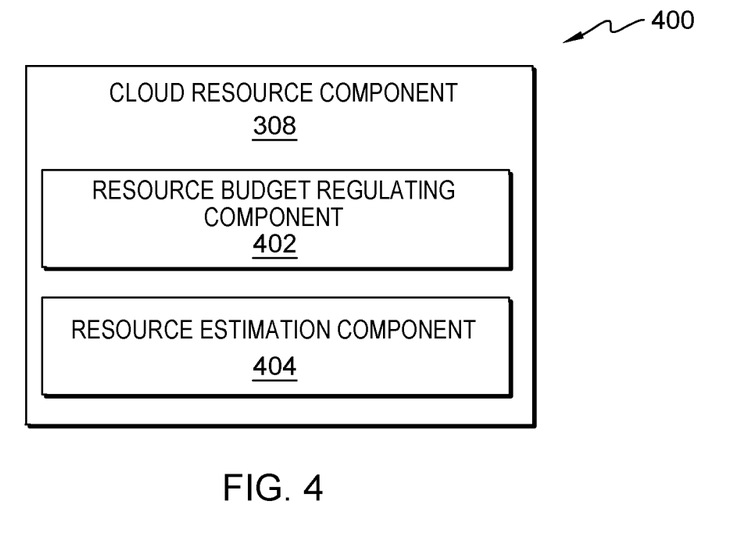
FIG. 4 is an exemplary detailed architecture, according to embodiments of the present invention.
Figure 5:
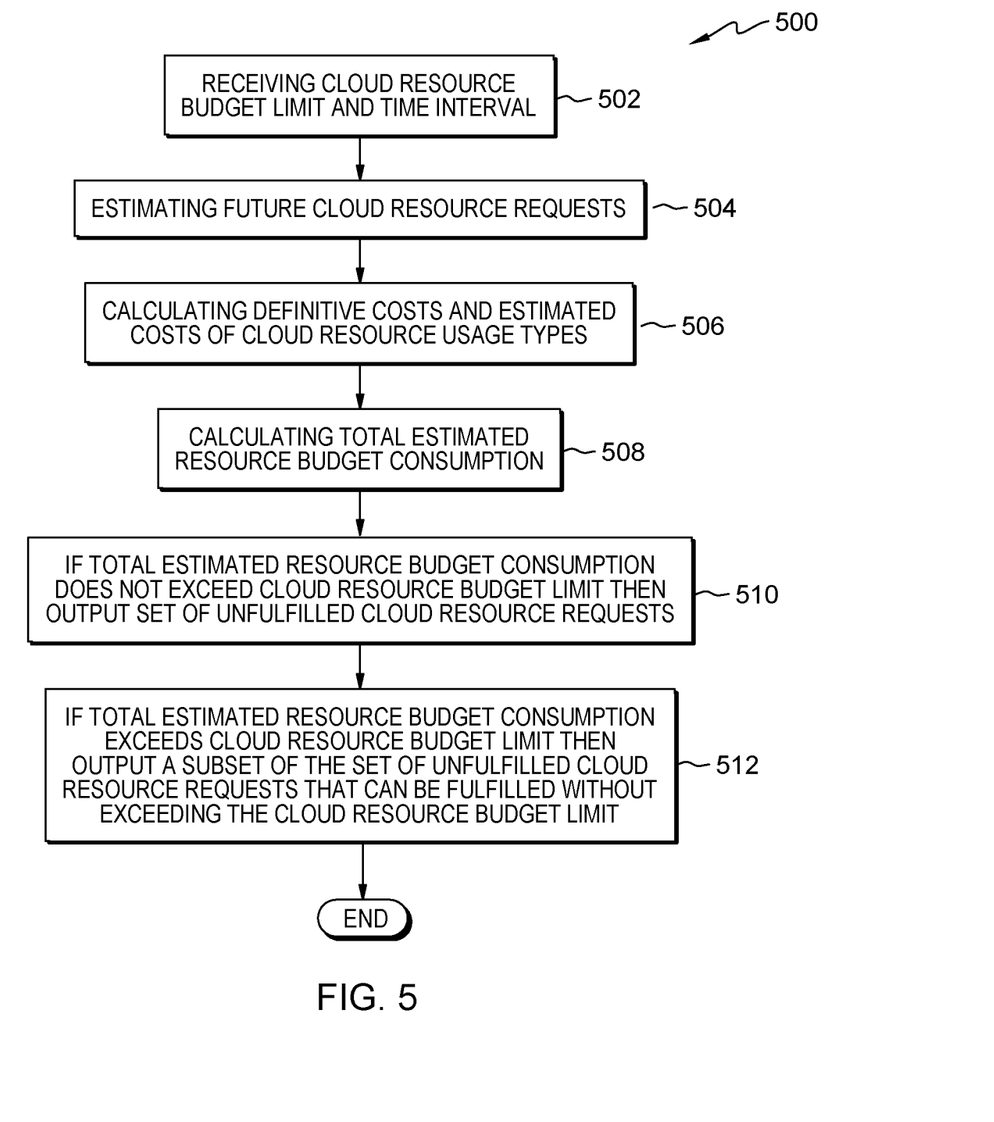
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit(s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a cloud resource system, to which the invention principles can be applied. The architecture 300 comprises a client computer 302, a cloud resource component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

In one embodiment of the present invention, cloud resource component 308, operational on server computer 304, can regulate resource consumption associated with a budget. In another aspect of an embodiment of the present invention, cloud resource component 308, can predict future expected cloud resource requests.

In one aspect of an embodiment of the present invention, a "budget time interval" can be defined as "a time interval, e.g., a day, a week, a month, a year, etc., for which a budget is defined for an organizational unit for consumption of cloud resources. In another aspect of an embodiment of the present invention, "elapsed time" can be defined as "an amount of time from the beginning of the current budget period until the present." In another aspect of an embodiment of the present invention, "remaining time" can be defined as "an amount of time from the present until a specified end of the current budget time interval, e.g., the time difference of the budget time interval and the elapsed time." In another aspect of an embodiment of the present invention, a "budget limit" can be defined as "a resource limit, in monetary terms, associated with a budget time interval and with an organizational unit." In another aspect of an embodiment of the present invention, a "remaining budget" can be defined as "a value, in monetary terms, associated with the remaining time of a budget time interval, and an organizational unit, i.e., the difference of the budget limit and the current value expended from the budget, allowing the remaining budget to be utilized to service further cloud resource requests."

In another aspect of an embodiment of the present invention, cloud resource component 308, at any point in time within the budget time interval, can calculate the following types of cloud resource usage that generates spending from the cloud resource budget: cloud resources that were leased, either within the current budget time interval or prior to that, provisioned by a cloud provider, and already returned within the current budget time interval; currently leased and not yet returned cloud resources that may have been leased either within the current budget time interval or prior to that (including cloud resources that were either already provisioned by a cloud provider, or alternatively requested from a cloud provider and not yet provisioned); existing unfulfilled cloud resource requests that were created but have not yet been requested from any cloud provider; and a prediction of future expected cloud resource requests that are expected to come within the remaining time of the current budget time interval.

In another aspect of an embodiment of the present invention, cloud resource component 308, can calculate the cost for cloud resources that were leased and already returned within the current budget time interval. The cost of this cloud resource usage is known and definitive, as these cloud resources were already returned to the cloud providers.

In another aspect of an embodiment of the present invention, cloud resource component 308, can calculate the cost for cloud resources that are currently leased and not yet returned cloud resources. It should be noted that there are two components of this cost. A first component is the cost of these cloud resources from the beginning of the budget time interval until the current point in time. This is a known and definitive cost. A second component is the cost of the future time where these cloud resources will continue to be leased until they are returned to the cloud providers. This is an estimated cost because it is not known when these cloud resources will be returned. Cloud resource component 308, can estimate this cost based on known techniques such as, but not limited to, assuming the cloud resource will remain allocated for the entire remaining time of the budget time interval. This technique allows cloud resource component 308 to calculate the cost for cloud resources from the current time until the end time of the budget time interval. Another known technique allows cloud resource component 308 to estimate a time when the cloud resource will be returned to the cloud provider based on generating an estimated time of return of the cloud resource. Based on this estimated time, the cost of the cloud resource can be calculated by cloud resource component 308, from the current time until the estimated time of its return.

In another aspect of an embodiment of the present invention, cloud resource component 308, can calculate the cost for existing unfulfilled cloud resource requests. It should be noted that the cost of unfulfilled cloud resource requests is not known because it is not known which cloud resources will be selected for allocation to fulfill these resource requests and it is not known when the selected cloud resources will be allocated and when the selected cloud resources will be returned. Cloud resource component 308, can estimate which cloud resources will be selected for allocation to fulfill an unfulfilled resource request based on known algorithms to select the most effective resource combination to fulfill a resource request.

In another aspect of an embodiment of the present invention, cloud resource component 308, can estimate the times of allocation and return of the cloud resources selected for an unfulfilled request, based on known techniques. One technique can assume the cloud resources in an unfulfilled request can be allocated in the current time instant and will remain allocated for the entire remaining time of the budget time interval. This technique can allow cloud resource component 308, to calculate the cost of the selected cloud resources from the current time until the end time of the budget time interval. In another known technique, cloud resource component 308, can estimate times when the selected cloud resources will be allocated and then returned to the cloud providers. Based on the above estimations of the selected cloud resources and their allocation and return times, cloud resource component 308, can calculate the cost of the unfulfilled cloud resource requests.

In another aspect of an embodiment of the present invention, cloud resource component 308, can predict future expected cloud resource requests that are expected to come within the remaining time of the current budget time interval. Accordingly, cloud resource component 308, can calculate a cost of future expected cloud resource requests using for example one of the methods specified previously for estimating the cost of existing unfulfilled cloud resource requests. It should be noted that a description of how to estimate the future expected cloud resource requests appears later in this disclosure.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise a cloud resource component 308, which can further comprise a resource budget regulating component 402, and a resource estimation component 404.

In one aspect of an embodiment of the present invention, resource budget regulating component 402 can determine if budget resource consumption should be regulated, i.e., triggered, based on calculating a total estimated budget consumption, determined as a summary of the total costs of the usage types. In another aspect of an embodiment, resource budget regulating component 402 can compare the total estimated budget consumption with the budget limit. If the total estimated budget consumption does not exceed the budget limit, then there is not a need to currently regulate budget consumption. If the total estimated budget consumption exceeds the budget limit, then there is need to currently regulate budget consumption. It should be noted that as circumstances change, the triggering of regulation of budget resource consumption can also change.

In one aspect of an embodiment of the present invention, resource budget regulating component 402 can provide an algorithm for regulating resource consumption based on inputs including, but not limited to, resource budget limit and budget time interval information, information on cloud resource usage types previously specified, e.g., both the definitive costs and the estimated costs required for all four cloud resource usage types, and priorities associated with cloud resource requests, wherein the priorities can be compared with priorities associated with other cloud resource requests. It should be noted that these priorities apply to any type of cloud resource request, e.g., an already fulfilled request, an existing unfulfilled request, or a future expected request.

In another aspect of an embodiment of the present invention, the resource budget regulating component 402 algorithm can provide outputs including, but not limited to a list of existing unfulfilled cloud resource requests that are selected to be fulfilled. The list can include a subset of the existing unfulfilled cloud resource requests, or all the existing unfulfilled cloud resource requests, or can be empty. It should be noted that there are cases where existing unfulfilled cloud resource requests that are not included in the output list, i.e., budget regulation is currently applied by leaving these unincluded requests unfulfilled for at the present time.

In another aspect of an embodiment of the present invention, the resource budget regulating component 402 algorithm can estimate the future expected cloud resource requests that are expected to come within the remaining time of the current budget time interval. In another aspect of an embodiment of the present invention, the resource budget regulating component 402 algorithm can calculate both the definitive cost and estimated cost of all cloud resource usage types and summarize these costs to a total estimated budget consumption. In another aspect of an embodiment of the present invention, the resource budget regulating component 402 algorithm can determine if the total estimated budget consumption exceeds the budget limit. If the total estimated budget consumption does not exceed the budget limit, then the resource budget regulating component 402 algorithm can output all the existing unfulfilled cloud resource requests as the existing unfulfilled cloud resource requests that can be fulfilled. If the total estimated budget consumption exceeds the budget limit, then the resource budget regulating component 402 algorithm can sort the cloud resource requests, both known requests and estimated requests, i.e., future expected requests, based on their associated priority, in descending order of priority; the resource budget regulating component 402 algorithm can select a subset of the cloud resource requests which does not exceed the budget limit, wherein the subset includes the highest priority requests, where the sum of the total aggregated cost of these requests and the cost of the currently leased and not yet returned cloud resources and the cost of the cloud resources that were leased and already returned within the current budget time interval, does not exceed the budget limit. It should be noted that the selected subset of requests can include both existing and estimated future expected requests. The resource budget regulating component 402 algorithm can output the existing unfulfilled cloud resource requests included in the selected subset, as the existing unfulfilled cloud resource requests that can be fulfilled.

In another embodiment of the present invention, the resource budget regulating component 402 algorithm can, in a case where there are resource allocation limits on the number of cloud resources of each specific type that can be allocated from cloud providers, modify the above algorithm by calculating an optimal resource combination for existing unfulfilled cloud resource requests and for future expected cloud resource requests. The resource budget regulating component 402 algorithm can process the resource requests in an order based on their priorities and subtract the calculated optimal resource combination of the request from the current resource allocation limits so that the updated resource allocation limits will be used for calculating the optimal resource combination for the next request in the ordering. It should be noted that when applying this algorithm, some of the resource requests from the list of resource requests may not be possible to fulfill because the resource allocation limits relevant for these requests have been reached. The requests that cannot be fulfilled should be filtered out from the requests considered further in the above algorithm.

In another aspect of an embodiment of the present invention, resource estimation component 404 can predict future expected cloud resource requests expected to occur within the remaining time of the current budget time interval. These predictions can be based on information maintained on similar historical requests. Information maintained for such cloud resource requests can include, but are not limited to, information specifying ownership of the request, e.g., organizational unit, user generating the request, cluster associated with the request, application associated with the request; information specifying time of entry of the request, e.g., the time that the request arrived, information specifying the start time and end time of the budget interval in effect when the request arrived; information specifying the types and amounts of resources included in the request; information specifying the cloud providers identified as potentially fulfilling the request; and the request's priority.

In another aspect of an embodiment of the present invention, resource estimation component 404 can determine if the cloud resource request has been fulfilled, and in this case the information maintained on the request can include, but is not limited to, which resources were provisioned for the requests and from which providers, a timestamp of when the resources were provisioned, a timestamp of when the resources were returned to the cloud and the costs incurred by the request. It should be noted that the information described above can be maintained in a data storage.

In another aspect of an embodiment of the present invention, resource estimation component 404 can, for a budget interval associated with an organizational unit, estimate the future expected cloud resource requests occurring during the time from the present time until the end of the current budget interval, i.e., the remaining time of the current budget interval, based on the stored information specified above.

In another aspect of an embodiment, resource estimation component 404 can select, from the stored cloud resource requests, the requests associated with the organizational unit with which the given budget interval is associated. From these selected cloud resource requests, further select the cloud resource requests whose entry time in their respective past budget interval falls within the remaining time in the present budget interval. Based on this refined set of cloud resource requests, resource estimation component 404 can calculate a set of expected cloud resource requests.

In another aspect of an embodiment of the present invention, resource estimation component 404 can divide the remaining time of the present budget interval and its corresponding past budget intervals into smaller sub-intervals, e.g., equal in length. For present sub-intervals, e.g., each one of the present sub-intervals, their corresponding past sub-intervals are sub-intervals with the same start time and end time relative to their respective past budget intervals, as the present sub-interval. For present sub-intervals, e.g., each one of the present sub-intervals, resource estimation component 404 can calculate a set of aggregated past cloud resource requests, where aggregated past cloud resource requests, e.g., each one of the aggregated past cloud resource requests, are associated with a specific past sub-interval corresponding to the present sub-interval.

In another aspect of an embodiment, resource estimation component 404 can assign past sub-intervals, e.g., each one of the past sub-intervals, corresponding with a present sub-interval to an aggregated past cloud resource request based on aggregating past cloud resource requests falling within this past sub-interval. Resource estimation component 404 can aggregate multiple resource requests into one resource request by calculating a summary for different types of requested resources based on the requests being aggregated, wherein the set of summaries for different types of resources constitutes the aggregate resource request.

In another aspect of an embodiment, resource estimation component 404 can assign past sub-intervals corresponding to present sub-intervals with aggregated past cloud resource requests. It should be noted that in some cases, there can be no past requests falling within a past sub-interval and accordingly, no aggregated past cloud resource request to assign. In another aspect of an embodiment, resource estimation component 404 can, for present sub-intervals, e.g., each one of the present sub-intervals, agglomerate aggregated past cloud resource requests associated with past sub-intervals corresponding to the present sub-interval, into an estimated cloud resource request. Resource estimation component 404 can perform the agglomeration by averaging the aggregated past resource requests into an estimated cloud resource request. It should be noted that averaging multiple resource requests into one resource request can be implemented by calculating an average for different types of requested resources based on the requests being aggregated, wherein the set of averages for all types of resources constitutes the average resource request.

In another aspect of an embodiment, resource estimation component 404 can assign present sub-intervals with an estimated cloud resource request. It should be noted that in some cases, there are no past requests falling within past sub-intervals associated with this present sub-interval. It should be noted that the set of estimated cloud resource requests calculated for the present sub-intervals of the present budget interval can be the set of future expected cloud resource requests.

In another aspect of an embodiment of the present invention, resource estimation component 404 can calculate a set of future expected cloud resource requests for the remaining time in a present budget interval. In another aspect of an embodiment of the present invention, resource estimation component 404 can store information on incoming cloud resource requests. In another aspect of an embodiment of the present invention, resource estimation component 404 can receive a current budget interval and a current time for estimating future expected cloud resource requests. In another aspect of an embodiment of the present invention, resource estimation component 404 can identify the requests associated with the organizational unit with which the given budget interval is associated based on the stored cloud resource requests information. In another aspect of an embodiment of the present invention, resource estimation component 404 can further identify from the identified cloud resource requests, the requests whose entry time in their respective past budget interval falls within the remaining time in the present budget interval. In another aspect of an embodiment of the present invention, resource estimation component 404 can divide the remaining time of the present budget interval and its corresponding past budget intervals into sub-intervals. In another aspect of an embodiment of the present invention, resource estimation component 404 can, for past sub-intervals, e.g., for each one of the past sub-intervals, corresponding with a present sub-interval, e.g., a present sub-interval, aggregate the past cloud resource requests falling within the past sub-interval(s) into an aggregated past cloud resource request. In another aspect of an embodiment of the present invention, resource estimation component 404 can, for present sub-intervals, e.g., for each one of the present sub-intervals, aggregate the aggregated past cloud resource requests, associated with the past sub-intervals corresponding to the present sub-interval, into an estimated cloud resource request. In another aspect of an embodiment of the present invention, resource estimation component 404 can, output the set of estimated cloud resource requests calculated for the present sub-intervals of the present budget interval as the set of future expected cloud resource requests.

In another embodiment of the present invention, resource estimation component 404 can calculate a set of expected future cloud resource requests for the remaining time in a present budget interval, selecting past requests to consider from the stored cloud resource requests based on selecting requests associated with the organizational unit with which the budget interval is associated; selecting from this subset, the requests whose entry time in their respective past budget interval falls within the remaining time in the present budget interval; calculating an average number of past cloud resource requests for the remaining time in the present budget interval based on averaging the numbers of past resources requests per past budget interval from the selected past cloud resource requests; calculating a median number of past cloud resource requests for the remaining time in the present budget interval based on calculating the median of the numbers of past resources requests per past budget interval from the selected past cloud resource requests; calculating a most frequent number of past cloud resource requests for the remaining time in the present budget interval based on calculating the most frequent number of the numbers of past resources requests per past budget interval from the selected past cloud resource requests; calculating an average past cloud resource request based on the selected past cloud resource requests by calculating the average resource request for the types of resources in the resource requests; calculating a median past cloud resource request based on the selected past cloud resource requests by calculating the median resource request for the types of resources in the resource requests; calculating a most frequent cloud resource request based on the selected past cloud resource requests by calculating the most frequent amount of resource requests for the types of resources in the resource requests; and output a set of expected cloud resource requests for the remaining time in the present budget interval, formed by populating the set with requests equal to the calculated average or median or most frequent number of past cloud resource requests for the remaining time in the present budget interval, where requests are formed based on the calculated average or median or most frequent past cloud resource requests.

In another embodiment of the present invention, resource estimation component 404 can form an output set of future expected cloud resource requests for the remaining time in the present budget interval based on adding recurring cloud resource requests to the output set. It should be noted that recurring cloud resource requests are requests configured to be recurring at designated times and/or frequencies in the future. It should further be noted that recurring cloud resource requests that are designated to be applied in the future and fall within the remaining time in the present budget interval can be added to the output set of expected cloud resource requests. In another aspect of the present invention, past cloud resource requests generated from recurring cloud resource requests are not required to be included in the set of past cloud resource requests, used for calculating the set of future expected cloud resource requests.

FIG. 5 is an exemplary flowchart of a method 500 for regulating cloud resource budget consumption. At step 502, an embodiment can receive, via resource budget regulating component 402, a cloud budget limit and time interval. At step 504, the embodiment can estimate, via resource budget regulating component 402, future cloud resource requests. At step 506, the embodiment can calculate, via resource budget regulating component 402, definitive costs and estimated costs of cloud resource usage types. At step 508, the embodiment can calculate, via resource budget regulating component 402, a total estimated resource budget consumption. At step 510, if the total estimated resource budget consumption does not exceed the cloud resource budget limit, then resource budget regulating component 402 outputs a set of unfulfilled cloud resource requests. At step 512, if the total estimated resource budget consumption exceeds the cloud resource budget limit, then resource budget regulating component 402 outputs a subset of the set of unfulfilled cloud resource requests without exceeding the cloud resource budget limit.

Figure 6:
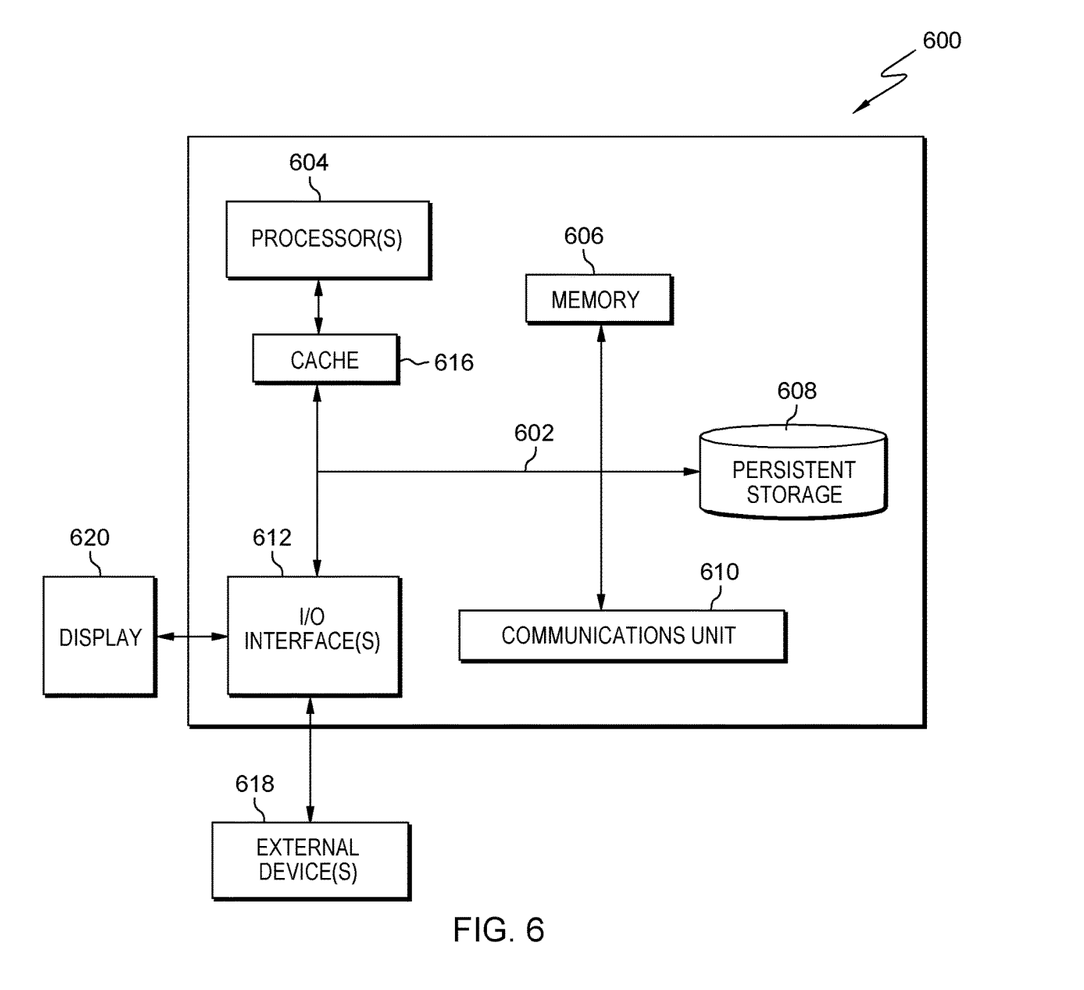
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for regulating cloud resource budget consumption, the computer-implemented method comprising:
    receiving, by one or more processors, a cloud resource budget limit and a cloud budget time interval;
    estimating, by the one or more processors, future cloud resource requests expected to arrive before an end of the cloud budget time interval;
    calculating, by the one or more processors, definitive costs and estimated costs of cloud resource usage types associated with cloud resource requests and summarizing a combine cost of the definite costs and estimated cost into a total estimated budget consumption;
    calculating, by the one or more processors, a total estimated resource budget consumption based on summing the definitive costs and the estimated costs;
    determining, by the one or more processors, if the total estimated resource budget consumption exceeds the cloud resource budget limit;
    responsive to the total estimated resource budget consumption not exceeding the cloud resource budget limit, outputting, by the one or more processors, a set of existing unfulfilled cloud resource requests that can be fulfilled;
    responsive to the total estimated resource budget consumption exceeding the cloud resource budget limit, outputting, by the one or more processors, a subset of the set of existing unfulfilled cloud resource requests that can be fulfilled and do not exceed the cloud resource budget limit; and
    processing the subset in an order of priorities associated with cloud resource requests.

2. The computer-implemented method of claim 1, wherein outputting a subset of the set of existing unfulfilled cloud resource requests further comprises:
    sorting the existing unfulfilled cloud resource requests by their associated priorities; and
    selecting a subset of the cloud resource requests, wherein the subset comprises highest priority requests and a total aggregated cost of the subset plus a cost of currently leased and not yet returned cloud resources and a cost of cloud resources leased and already returned within a current budget time interval does not exceed the cloud resource budget limit.

3. The computer-implemented method of claim 1, wherein calculating the definitive costs and estimated costs of the subset further comprises:
calculating an optimal resource combination for the cloud resource requests;
updating the cloud resource budget limit based on subtracting the optimal resource combination;
calculating an optimal resource combination for a next cloud resource request based on the updating;
identifying cloud resource requests that cannot be fulfilled because the cloud resource budget limit has been exceeded; and
filtering from consideration the cloud resource requests that cannot be fulfilled.

4. The computer-implemented method of claim 1, wherein cloud resource usage types comprise at least one of cloud resources that were leased from a cloud provider and returned within a current budget time interval, leased from a cloud provider and not returned, unfulfilled cloud resource requests that were created but not requested from a cloud provider, or future cloud resource requests that are expected to occur within the current budget time interval.

5. The computer-implemented method of claim 4, wherein calculating the definitive costs and the estimated costs of cloud resources leased from a cloud provider and not returned further comprises calculating a definitive cost from a beginning of the current budget time interval to a current point in time, and at least one of calculating the estimated cost of the cloud resource from the current time until an end time of the current budget time interval or calculating the estimated cost of the cloud resource from the current time until an estimated time the cloud resources will be returned to the cloud provider.

6. The computer-implemented method of claim 4, wherein calculating the estimated costs of unfulfilled cloud resources further comprises estimating cloud resources for allocation to fulfill an unfulfilled resource request, at least one of calculating a cost of allocating the cloud resources at a current time and returning the cloud resources at an end time of the current budget time, or calculating a cost based on estimating an allocation time of the cloud resources and estimating a return time of the cloud resources, and calculating a cost based a difference between an allocation and a return of the cloud resources.

7. The computer-implemented method of claim 4, wherein calculating the cost for future cloud resource requests expected to occur within a remaining time of the current budget time interval comprises at least one of estimating future cloud resource requests that are expected to come within a remaining time of the current budget time interval or estimating which cloud resources will be selected for allocation to fulfill a future expected resource request, and estimating times of allocation and return of the cloud resources selected for a future expected request by at least one of allocating the cloud resources at the current time, returning the cloud resources at the end of the budget time interval and calculating the cost of the cloud resources from the current time until the end of the budget time interval or estimating times when selected cloud resources will be allocated and returned and calculating the cost of the cloud resources based on a difference of an estimated allocation time and an estimated return time.

8. A computer program product for regulating cloud resource budget consumption, the computer program product comprising:
one or more non-transitory computer readable storage media and program instructions stored on the one or more non-transitory computer readable storage media, the program instructions comprising:
program instructions to receive a cloud resource budget limit and a cloud budget time interval;
program instructions to estimate future cloud resource requests expected to arrive before an end of the cloud budget time interval;
program instructions to calculate definitive costs and estimated costs of cloud resource usage types associated with cloud resource requests and summarizing a combine cost of the definite costs and estimated cost into a total estimated budget consumption;
program instructions to calculate a total estimated resource budget consumption based on summing the definitive costs and the estimated costs;
program instructions to determine if the total estimated resource budget consumption exceeds the cloud resource budget limit;
responsive to the total estimated resource budget consumption not exceeding the cloud resource budget limit, program instructions to output a set of existing unfulfilled cloud resource requests that can be fulfilled; and
responsive to the total estimated resource budget consumption exceeding a cloud resource budget limit, program instructions to output a subset of the set of existing unfulfilled cloud resource requests that can be fulfilled and do not exceed the cloud resource budget limit; and
program instructions to process the subset in an order of priorities associated with cloud resource requests.

9. The computer program product of claim 8, wherein outputting a subset of the set of existing unfulfilled cloud resource requests further comprises:
program instructions to sort the existing unfulfilled cloud resource requests by their associated priorities; and
program instructions to select a subset of the cloud resource requests, wherein the subset comprises a highest priority requests and a total aggregated cost of a subset plus a cost of currently leased and not yet returned cloud resources and a cost of cloud resources leased and already returned within a current budget time interval does not exceed the cloud resource budget limit.

10. The computer program product of claim 8, wherein calculating the definitive costs and estimated costs of the subset further comprises:
program instructions to calculate an optimal resource combination for the cloud resource requests;
program instructions to update the cloud resource budget limit based on subtracting the optimal resource combination;
program instructions to calculate an optimal resource combination for a next cloud resource request based on the updating;
program instructions to identify cloud resource requests that cannot be fulfilled because the cloud resource budget limit has been exceeded; and
program instructions to filter from consideration the cloud resource requests that cannot be fulfilled.

11. The computer program product of claim 8, wherein cloud resource usage types comprise at least one of cloud resources that were leased from a cloud provider and returned within a current budget time interval, leased from a cloud provider and not returned, unfulfilled cloud resource requests that were created but not requested from a cloud provider, or future cloud resource requests that are expected to occur within the current budget time interval.

12. The computer program product of claim 11, wherein calculating the definitive costs and the estimated costs of cloud resources leased from a cloud provider and not returned further comprises calculating a definitive cost from a beginning of a current budget time interval to a current point in time, and at least one of calculating the estimated cost of the cloud resource from a current time until an end time of the current budget time interval or calculating the estimated cost of the cloud resource from the current time until an estimated time the cloud resources will be returned to the cloud provider.

13. The computer program product of claim 11, wherein calculating the estimated costs of unfulfilled cloud resources further comprises estimating cloud resources for allocation to fulfill an unfulfilled resource request, at least one of calculating a cost of allocating the cloud resources at a current time and returning the cloud resources at an end time of the current budget time, or calculating a cost based on estimating an allocation time of the cloud resources and estimating a return time of the cloud resources, and calculating a cost based a difference between an allocation and a return of the cloud resources.

14. The computer program product of claim 11, wherein calculating the cost for future cloud resource requests expected to occur within a remaining time of the current budget time interval comprises at least one of estimating future cloud resource requests that are expected to come within remaining time of the current budget time interval or estimating which cloud resources will be selected for allocation to fulfill a future expected resource request, and estimating times of allocation and return of the cloud resources selected for a future expected request by at least one of allocating the cloud resources at a current time, returning the cloud resources at the end of the budget time interval and calculating the cost of the cloud resources from the current time until the end of the budget time interval or estimating times when selected cloud resources will be allocated and returned and calculating the cost of the cloud resources based on a difference of an estimated allocation time and an estimated return time.

15. A computer system for regulating cloud resource budget consumption, the computer system comprising:
one or more computer processors;
one or more non-transitory computer readable storage media; and
program instructions stored on the one or more non-transitory computer readable storage media, the program instructions comprising:
program instructions to receive a cloud resource budget limit and a cloud budget time interval;
program instructions to estimate future cloud resource requests expected to arrive before an end of the cloud budget time interval;
program instructions to calculate definitive costs and estimated costs of cloud resource usage types associated with cloud resource requests and summarizing a combine cost of the definite costs and estimated cost into a total estimated budget consumption;
program instructions to calculate a total estimated resource budget consumption based on summing the definitive costs and the estimated costs;
program instructions to determine if the total estimated resource budget consumption exceeds the cloud resource budget limit; responsive to the total estimated resource budget consumption not exceeding the cloud resource budget limit, program instructions to output a set of existing unfulfilled cloud resource requests that can be fulfilled;
responsive to the total estimated resource budget consumption exceeding a cloud resource budget limit, program instructions to output a subset of the set of existing unfulfilled cloud resource requests that can be fulfilled and do not exceed the cloud resource budget limit; and
program instructions to process the subset in an order of priorities associated with cloud resource requests.

16. The computer system of claim 15, wherein calculating the definitive costs and estimated costs of the subset further comprises:
program instructions to calculate an optimal resource combination for the cloud resource requests;
program instructions to update the cloud resource budget limit based on subtracting the optimal resource combination;
program instructions to calculate an optimal resource combination for a next cloud resource request based on the updating;
program instructions to identify cloud resource requests that cannot be fulfilled because the cloud resource budget limit has been exceeded; and
program instructions to filter from consideration the cloud resource requests that cannot be fulfilled.

17. The computer system of claim 15, wherein cloud resource usage types comprise at least one of cloud resources that were leased from a cloud provider and returned within a current budget time interval, leased from a cloud provider and not returned, unfulfilled cloud resource requests that were created but not requested from a cloud provider, or future cloud resource requests that are expected to occur within a current budget time interval.

18. The computer system of claim 17, wherein calculating the definitive costs and the estimated costs of cloud resources leased from a cloud provider and not returned further comprises calculating a definitive cost from a beginning of a current budget time interval to a current point in time, and at least one of calculating the estimated cost of the cloud resource from a current time until an end time of the current budget time interval or calculating the estimated cost of the cloud resource from the current time until an estimated time the cloud resources will be returned to the cloud provider.

19. The computer system of claim 17, wherein calculating the estimated costs of unfulfilled cloud resources further comprises estimating cloud resources for allocation to fulfill an unfulfilled resource request, at least one of calculating a cost of allocating the cloud resources at a current time and returning the cloud resources at an end time of the current budget time, or calculating a cost based on estimating an allocation time of the cloud resources and estimating a return time of the cloud resources, and calculating a cost based a difference between an allocation and a return of the cloud resources.

20. The computer system of claim 17, wherein calculating the cost for future cloud resource requests expected to occur within a remaining time of the current budget time interval comprises at least one of estimating future cloud resource requests that are expected to come within the remaining time of the current budget time interval or estimating which cloud resources will be selected for allocation to fulfill a future expected resource request, and estimating times of allocation and return of the cloud resources selected for a future expected request by at least one of allocating the cloud resources at a current time, returning the cloud resources at the end of the budget time interval and calculating the cost of the cloud resources from a current time until an end of a budget time interval or estimating times when selected cloud resources will be allocated and returned and calculating the cost of the cloud resources based on a difference of an estimated allocation time and an estimated return time.

* * * * *